United States Patent Office 2,993,326
Patented July 25, 1961

2,993,326
SIDE DELIVERY RAKE
Cornelis van der Lely and Ary van der Lely, Maasland, Netherlands, assignors to C. van der Lely N.V.
Filed Apr. 3, 1957, Ser. No. 650,463
Claims priority, application Netherlands Apr. 12, 1956
5 Claims. (Cl. 56—377)

This invention relates to a device for laterally displacing hay or the like materials lying on the ground, the device being of the kind comprising a frame, and, mounted on the frame, a plurality of rake wheels, each of which is adapted to be rotated by coming into contact with the ground and/or the material lying thereon, there being means for connecting the device to a tractor or a like vehicle for imparting movement to the device, and the device also being of the kind which is operable in at least two different working positions, in each of which the rake wheels are arranged oblique with respect to the intended direction of travel of the device.

Devices of the kind set forth are known, but have the disadvantage that the conversion of the device from one working position into another working position is generally a complex and time-consuming operation in which the driver has to leave his seat in order to effect the conversion.

By the term "working position" as used in this specification, there is meant a position of the device in which the device is capable of laterally displacing hay or the like material lying on the ground, and, in a "working position," the device may operate, for example, as a side-delivery rake, swath turner, tedder, or swath spreader. With devices of the kind set forth, it is known to bring the rake wheels into an inoperative or transport position, where the rake wheels are not in contact with the ground, and it will be appreciated that a transport position is not a working position, as hereinbefore defined.

According to the invention there is provided a mechanism for moving the device from one working position into another working position, the mechanism being operable from the seat for the driver of the tractor or traction vehicle.

Figure 1:
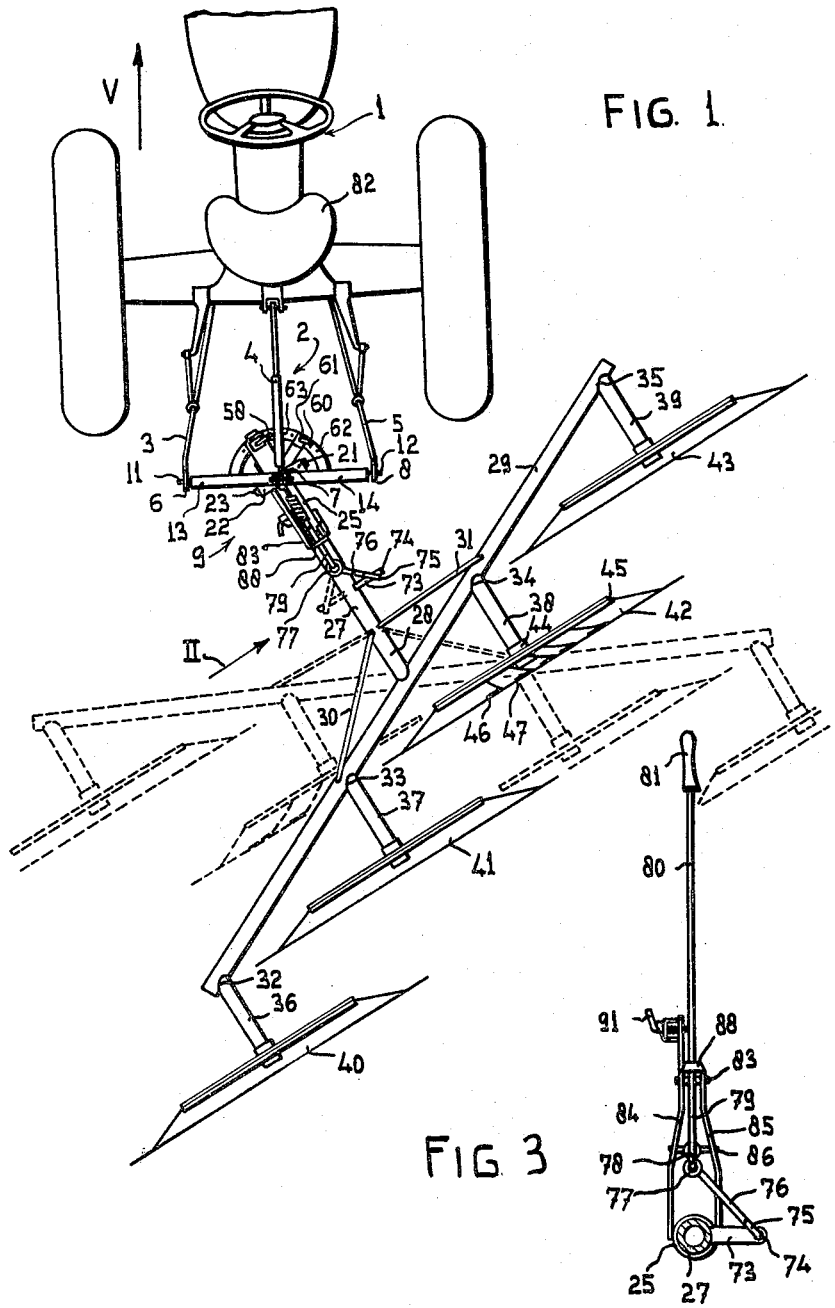
Figure 2:
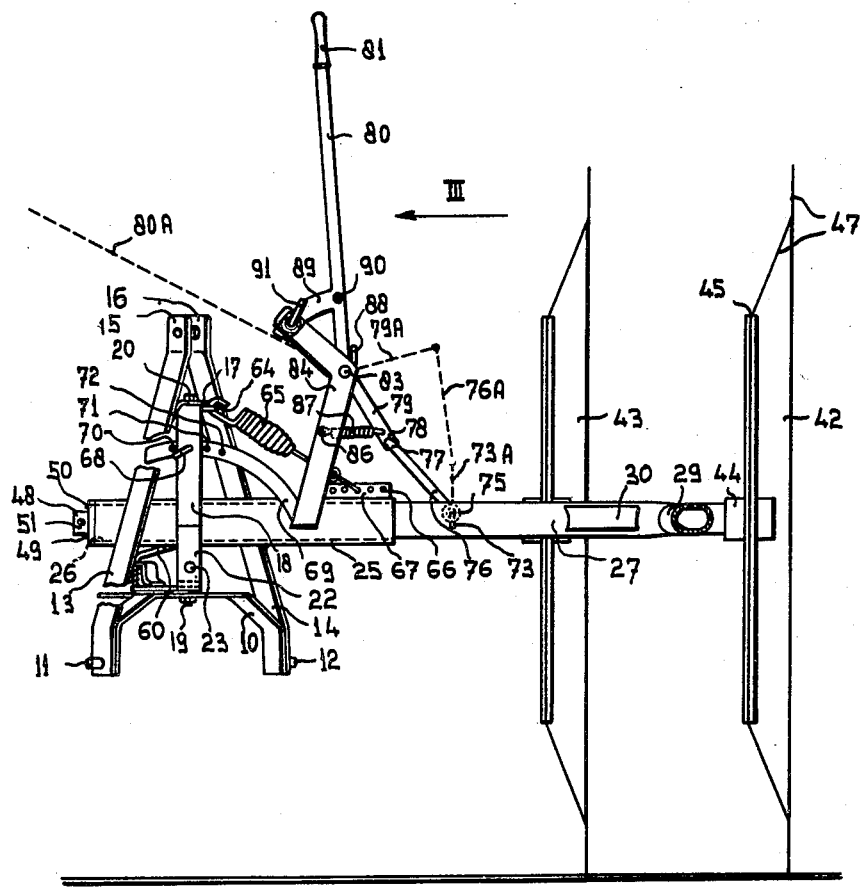

For a better understanding of the invention, and to show how the same may be carried into effect, reference will now be made to the accompanying drawings, in which:

FIG. 1 is a plan view of a raking device for laterally displacing material lying on the ground, FIG. 2 is an enlarged view, partly in section, in the direction of the arrow II of part of the device shown in FIG. 1, and FIG. 3 is a view, partly in section, in the direction of the arrow III of a part of the device shown in FIG. 2.

Referring now to the drawings, there is shown a raking device for laterally displacing material lying on the ground, the device being connected to a tractor 1 which is provided with a lifting device 2. The lifting device 2 comprises three arms 3, 4 and 5, the rear ends 6, 7 and 8 of which are connected to a coupling device 9 of the raking device. The coupling device 9 comprises an arched strip 10, and obliquely extending strips 13 and 14 secured on either side of the arched strip 10, the strips 10, 13 and 14 forming a substantially triangular-shaped structure. The strips 13 and 14 carry aligned pins 11 and 12 respectively at their lower ends, and are secured together by a strip 17 near their apertured, upper ends 15 and 16, which are connected to the end 7 of the arm 4 of the lifting device 2. A bar 18 is secured between the strips 10 and 17 by means of bolts 19 and 20, the bar 18 being mounted so as to be rotatable about a vertical axis which is defined by the bolts 19 and 20. Two obliquely extending strips 21 and 22 are secured to the lower end of the bar 18, and serve to position a horizontal shaft 23.

A normally horizontal tube 25 is mounted by means (not shown) for turning about the shaft 23, and the front end 26 of a frame member formed as a bar 27 is disposed within tube 25. The rear end 28 of the bar 27 is connected to another frame member formed as a beam 29, the junction between the bar 27 and the beam 29 being reinforced by means of strips 30 and 31, and the acute angle between the beam 29 and the bar 27 being substantially 60°.

At 32, 33, 34 and 25, shafts or stub-axles 36, 37, 38 and 39 are secured to the beam 29, the stub-axles 36 to 39 extending generally rearwardly of the device, and lying substantially parallel to the bar 27. Each stub-axle 36, 37, 38 and 39 carries a rake wheel 40, 41, 42 and 43 respectively. All the rake wheels which are diagrammatically shown are similar to one another and are known, and it will suffice to describe the rake wheel 42 in somewhat greater detail. The rake wheel 42 consists of a hub 44, which is mounted on the stub-axle 38 so as to be rotatable, but not axially displaceable. A hoop or rim 45 is connected to the hub 44, by spokes (not shown), and the rake wheel has a plurality of circumferential resilient tines 46 and 47.

The front end 26 of the bar 27 has a prolongation 48 of reduced diameter, the prolongation 48 extending through an aperture 49 in an annular disc 50 which covers the front end of the tube 25. A split pin 51 passes through a hole formed in the prolongation 48, so as to prevent the bar 27 from moving relative to the tube 25.

An arm 61 is secured to the bar 18, and a semi-circular strip 62 is secured to the strip 10, the strip 62 being formed with apertures 63. The free end of the arm 61 is formed with an aperture, and the arm 61 may be locked to the strip 62 by passing a locking pin 60 through the aperture in the end of the arm 61 and a registering aperture 63, thereby locking the bar 18 against rotation.

An eye 64 is secured to the upper end of the bar 18, and one end of a draw-spring 65 is hooked into the eye 64, the other end of the spring 65 being secured in one of a plurality of apertures 66 formed in a strip 67 attached to the tube 25. A curved strip 69 is secured to the tube 25, and is formed with apertures 70, 71 and 72. An aperture is formed in the bar 18, and by passing a pin 68 through the aperture in the bar 18 and a registering aperture in the curved strip 69, the position of the bar 27 may be fixed relatively to bar 18.

A horizontal bar 73 is secured to, and extends radially from the bar 27, the free end of the bar 73 being formed with an aperture or eyelet 74 (see FIG. 3). A connecting rod 76 is formed with apertures or eyelets 75 and 77, one at each end of the rod, the eyelet 75 engaging with the eyelet 74 in such a manner that there is some play between the eyelets 74 and 75. The eyelet 77 engages with an eyelet 78 formed at the free end of the foot 79 of a control means or lever 80, there being some play also between the eyelets 77 and 78. The upper end of the lever 80 is provided with a hand grip 81, and the lever 80 is disposed so as to be operable, by the driver of the tractor 1, from a seat 82. The lever 80 is mounted for rotation about a horizontal shaft 83 which is supported by brackets 84 and 85 rigidly secured to the tube 25. The brackets 84 and 85 are inter-connected by a pin 86 which is disposed below the shaft 83, and to which one end of a draw spring 87 is secured, the other end of the spring 87 being secured to the foot 89 of the lever. The brackets 84 and 85 are also inter-connected by a stop 88, which determines one extreme position on the lever 80, the spring 87 urging the lever 80 against the stop 88. A sector 89 is provided on the lever 80, and is formed with a hole 90 at the junction of the sector 89 and the lever 80. A spring-loaded pin 91 is carried at the free end of a prolongation of the bracket 84, and the pin 91 can be urged into contact with the sector 89.

The raking device shown in the drawings has a first working position in which the device can operate as a side-delivery rake, this position being shown in full lines in FIG. 1. In the operation of the raking device as a side-delivery rake, the lifting device 2 of the tractor 1 is set to a position such that the rake wheels 40 to 43 rest only lightly on the ground, under the action of the spring 65. The rake wheels 40 to 43 are arranged oblique to the intended direction of travel of the device, and, when viewed in the intended direction of travel, overlap one another, so that when the device is moved by the tractor in the direction of the arrow V the device will laterally displace hay or the like material lying on the ground and operate as a side-delivery rake.

The raking device shown in the drawings also has another working position, in which the device can operate as a tedder, this working position being shown in broken lines in FIG. 1. Again the rake wheels 40 to 43 rest lightly on the ground due to the setting of the lifting device 2 and the action of the spring 65. When the device is moved by the tractor in the direction of the arrow V, the rake wheels 40 to 43 will ted hay or the like material lying on the ground.

The bar 27 is rotatable in the tube 25, so that the part of the raking device consisting of the bar 27, the beam 29 and the rake wheels 40 to 43 is rotatable relative to the part of the device constituted by the coupling device 9 and the lever 80. In the working position of the raking device in which the device can act as a side-delivery rake, relative rotation between the bar 27 and the tube 25 is restricted due to the fact that pivotal connection between the eyelets 77 and 78 lies below the oblique plane which passes through the shaft 83 and the substantially horizontal bar 73, and is also due to the provision of the stop 88 which prevents the lever 80 and the foot 79 thereof from turning in a clockwise direction (as seen in FIG. 2). Relative rotation between the bar 27 and the tube 25 through an angle of about 10° is, however, permitted, due to the play in the pivotal connections between the eyelets 74 and 75, and the eyelets 77 and 78, since a compressive force in the connecting rod 76 (which force would have a horizontal component acting to the left (FIG. 2) on the pivotal connection between the eyelets 77 and 78), cannot cause the foot 79 to move in a clockwise direction about the shaft 83. Rotation of the bar 27 in the opposite direction causing the bar 73 to move downwardly, is also possible due to the play on the pivotal connections between the eyelets, and this will cause a tensile force to be set up in the connecting rod 76. This tensile force will, however, only cause the pivotal connection between the eyelets 77 and 78 to move slightly towards the aforesaid oblique plane against the action of the spring 87, this movement being insignificant. In either case, the spring 87 prevents the lever 80 from being moved away from the stop 88 accidentally, and rotation of the bar 27 will be small due to the balancing action of the rake wheels 40 to 43 which tend to maintain the beam 29 in a substantially horizontal position.

When it is desired to convert the raking device from the position in which it can operate as a side-delivery-rake to the position in which it can operate as a tedder, the lifting device 2 is operated so as to raise the raking device a considerable distance from the ground. The driver of the tractor then operates the lever 80 while sitting on the seat 82. The driver pulls the lever 80 towards him so that the lever occupies the position 80A shown in broken lines in FIG. 2, the lever being operated against the action of the spring 87. This movement of the lever 80 positions the foot 79 of the lever at 79A, and positions the connecting rod 76 and the bar 73 at the positions 76A and 73A respectively. This movement of the bar 73 to the position 73A causes the bar 27, the beam 29 and the rake wheels 40 to 43 to be turned through 90° relative to the tube 25. Due to the momentum of the beam 29 and the rake wheels, these parts will tend to rotate through more than 90°, and as soon as the bar 73 has passed through a vertical position, the driver moves the lever 80 backwards so as to force the bar 73 downwards until it again occupies a horizontal position, and the beam 29 and the rake wheels 40 to 43 occupy the positions shown in broken lines in FIG. 1. In this new position, the spring 87 again urges the lever 80 into contact with the stop 88, and small angular displacements of the bar 27 are possible due to the play at the pivotal connections between the eyelets.

In the foregoing description, it has been assumed that the pin 91 has been rendered inoperative. However, if the pin is rendered operative so that when lever 80 is in the position 80A the pin 91 can engage in the hole 90, the lever 80 can be locked in the position 80A, and in this position the beam 29 has been turned through 90° relative to the position shown in full lines in FIG. 1, so that the overall width of the device is a minimum. This position corresponds to the transport position in which the device can readily be transported by the tractor.

In the raking device shown in the drawings, the bar 73 is disposed on the right-hand side of the bar 27 when the device is in the posititon in which it can operate as a side-delivery rake. When the raking device is raised from the ground by the operation of the lifting device 2, the rear part of the device becomes disposed further from the ground than the front part of the device, and thus by disposing the bar 73 on the right-hand side of the bar 27, the rake wheel 43 moves upwardly and the rake wheel 40 moves downwardly when the bar 27 is turned through 90°. If the bar 73 were located on the left-hand side of the bar 27, then the rake wheel 43 would move downwardly and the rake wheel 40 would move upwardly, but this might have the disadvantage that the rake wheel 43, not being raised so high above the ground as the rake wheel 40, would come into contact with the ground and be damaged. It will be appreciated however, that the disposition of the bar 73 will depend upon the actual raking device employed, and, if, for instance, the raking device is to be one which, in its position as a side-delivery rake, is to deliver to the right instead of to the left, then it will be necessary to dispose the bar 73 on the other side of the bar 27. It is also possible to provide the bar 27 with two bars 73, one on each side of the bar 27, and to make the connecting rod 76 in such a way that it can be connected to either of the bars 73.

What we claim is:

1. A device for laterally displacing material lying on the ground and for attachment to a tractor having a seat for an operator, said device comprising a frame member, a plurality of rake wheels on said frame member, a normally horizontal tube operatively associated with said frame member, said tube defining a pivot axis about which said frame member is rotatable, a coupling device coupling said horizontal tube to the tractor, and a control means operatively associated with said tube and frame member and manually engageable from said seat for pivoting said frame about said axis whereby said rake wheels assume different positions for the displacing of said material.

2. A device as claimed in claim 1 comprising a bar on said frame member rotatably accommodated in said tube; said control means comprising a lever, a bracket supporting said lever on said tube for movements about an axis normal to said tube, and a linkage system coupling said lever to said bar for converting pivotal movements of said lever into rotational movements of said bar.

3. A device for displacing material lying on the ground comprising a bar, a plurality of rake wheels, a frame member supporting said wheels and coupled to said bar, means coupled to said frame member and bar supporting said wheels in alignment at an angle with respect to said bar, a tube rotatably accommodating said bar, and control means operatively associated with said tube and for controllably rotating said bar in said tube for changing the alignment of the wheels relative to said tube.

4. A device as claimed in claim 3 wherein said control means comprises a lever, a bracket extending from said tube for supporting said lever, means associated with said bracket for constraining said lever to a pivot movement about an axis perpendicular to said tube, and a linkage system coupling said lever to said bar for converting pivotal movements of the lever into rotations of the bar.

5. A device as claimed in claim 4 wherein said linkage system comprises a second bar coupled to the first said bar and normally extending laterally and horizontally therefrom, and a connecting rod pivotally engaging said lever and said second bar so that a predetermined displacement of said lever operates through said connecting rod to move said second bar into vertical position whereby the first said bar is rotated.

References Cited in the file of this patent

UNITED STATES PATENTS

| | | |
|---|---|---|
| 2,621,465 | Klemm | Dec. 16, 1952 |
| 2,689,446 | Sorrels | Sept. 21, 1954 |
| 2,757,504 | Elfes et al. | Aug. 7, 1956 |
| 2,786,319 | Happe et al. | Mar. 26, 1957 |

FOREIGN PATENTS

| | | |
|---|---|---|
| 1,094,584 | France | Dec. 8, 1954 |